(12) United States Patent
Subramanian et al.

(10) Patent No.: US 9,354,776 B1
(45) Date of Patent: May 31, 2016

(54) APPLIED CLIENT-SIDE SERVICE INTEGRATIONS IN DISTRIBUTED WEB SYSTEMS

(71) Applicant: Aspen Technology, Inc., Burlington, MA (US)

(72) Inventors: Ashok R. Subramanian, Cambridge, MA (US); Samuel Provencher, Waltham, MA (US); Jack Shapiro, Nashua, NH (US)

(73) Assignee: Aspen Technology, Inc., Bedford, MA (US)

( * ) Notice: Subject to any disclaimer, the term of this patent is extended or adjusted under 35 U.S.C. 154(b) by 172 days.

(21) Appl. No.: 14/186,796

(22) Filed: Feb. 21, 2014

(51) Int. Cl.
*G06F 3/048* (2013.01)
*G06F 3/0481* (2013.01)
*G06F 3/0486* (2013.01)

(52) U.S. Cl.
CPC .......... *G06F 3/04817* (2013.01); *G06F 3/0486* (2013.01)

(58) Field of Classification Search
CPC . G06F 11/324; G06F 21/552; G06F 2201/86; G06F 2201/875; G05B 19/41885; G05B 2219/23255–2219/32342; G05B 23/0216; G05B 23/0272; H04L 41/22; H04L 12/2602
See application file for complete search history.

(56) References Cited

U.S. PATENT DOCUMENTS

| | | | |
|---|---|---|---|
| D403,673 S | 1/1999 | Arora et al. | |
| D420,995 S | 2/2000 | Imamura et al. | |
| D451,928 S | 12/2001 | Van Huong | |
| D454,138 S | 3/2002 | Imamura et al. | |
| D462,695 S | 9/2002 | Nguyen Van Huong | |
| D500,766 S | 1/2005 | Hanisch et al. | |
| D592,223 S | 5/2009 | Neuhaus | |
| D593,120 S | 5/2009 | Bouchard et al. | |
| D598,468 S | 8/2009 | Hirsch et al. | |
| D606,091 S | 12/2009 | O'Donnell et al. | |
| D607,007 S | 12/2009 | Kocmick | |
| D614,192 S | 4/2010 | Takano et al. | |
| D624,928 S | 10/2010 | Agnetta et al. | |
| D628,584 S | 12/2010 | Umezawa | |
| D629,410 S | 12/2010 | Ray et al. | |
| D657,377 S | 4/2012 | Vance et al. | |

(Continued)

OTHER PUBLICATIONS

"AspenTech Brings Search and High Performance Trending to Manufacturing Execution Systems with New Release of Aspen InfoPlus.21® Software", Mar. 6, 2012, PDF downloaded from http://www.aspentech.com/_ThreeColumnLayout.aspx?pageid=2147485680&id=15032385728, (2 pages) on Apr. 29, 2013.

(Continued)

*Primary Examiner* — Claudia Dragoescu
(74) *Attorney, Agent, or Firm* — Hamilton, Brook, Smith & Reynolds, P.C.

(57) ABSTRACT

In-context compatibility of one or more services or application instances running as services with currently active work is monitored. Respective context-sensitive icons indicate contextual compatibility and availability of corresponding services. The context-sensitive icon is displayed in a graphical user interface of a web application. Availability of one or more services or application instances running as services is indicated in the graphical user interface using different states of the context-sensitive icon. A user may select the icon corresponding to an available and compatible service to be applied to the currently active work in the web application. A single user gesture type command releases the corresponding service.

21 Claims, 11 Drawing Sheets

(56) References Cited

U.S. PATENT DOCUMENTS

| | | | |
|---|---|---|---|
| D658,204 S | 4/2012 | Jones | |
| D660,313 S | 5/2012 | Williams et al. | |
| D661,369 S | 6/2012 | Nelson | |
| D674,405 S | 1/2013 | Guastella et al. | |
| D678,320 S | 3/2013 | Kanalakis, Jr. et al. | |
| D678,894 S | 3/2013 | Kanalakis, Jr. et al. | |
| D678,895 S | 3/2013 | Ebler et al. | |
| D681,663 S | 5/2013 | Phelan et al. | |
| D681,664 S | 5/2013 | Phelan et al. | |
| D681,667 S | 5/2013 | Phelan | |
| D682,293 S | 5/2013 | Kanalakis, Jr. et al. | |
| D682,847 S | 5/2013 | Gardner et al. | |
| D682,866 S | 5/2013 | Peters et al. | |
| D687,063 S | 7/2013 | Myung et al. | |
| D688,692 S | 8/2013 | Tanghe et al. | |
| D691,160 S | 10/2013 | Schupp et al. | |
| D694,257 S | 11/2013 | McKinley et al. | |
| D698,816 S | 2/2014 | Phelan et al. | |
| D699,746 S | 2/2014 | Pearson et al. | |
| D700,208 S | 2/2014 | Phelan et al. | |
| D704,207 S | 5/2014 | Lee et al. | |
| D704,733 S | 5/2014 | Jewitt | |
| D706,828 S | 6/2014 | Hollobaugh | |
| D709,077 S | 7/2014 | Jonsson et al. | |
| 8,788,068 B2 | 7/2014 | Kocis et al. | |
| D710,892 S | 8/2014 | Hollobaugh et al. | |
| D722,075 S | 2/2015 | Zhang et al. | |
| D726,214 S | 4/2015 | Wantland et al. | |
| D729,836 S | 5/2015 | Lee | |
| D730,388 S | 5/2015 | Rehberg et al. | |
| D730,394 S | 5/2015 | Bray | |
| D730,397 S | 5/2015 | Oh et al. | |
| D730,932 S | 6/2015 | Kim et al. | |
| D730,952 S | 6/2015 | Siboni et al. | |
| D731,521 S | 6/2015 | Heo et al. | |
| D731,525 S | 6/2015 | Myers | |
| 9,046,881 B2 | 6/2015 | Blevins et al. | |
| D737,299 S | 8/2015 | Hisada et al. | |
| D737,321 S | 8/2015 | Lee | |
| D750,123 S | 2/2016 | Subramanian et al. | |
| 2010/0088654 A1* | 4/2010 | Henhoeffer | G06F 3/04883 715/863 |
| 2010/0332273 A1 | 12/2010 | Balasubramanian et al. | |
| 2012/0029661 A1* | 2/2012 | Jones | G05B 19/0426 700/17 |
| 2013/0339100 A1 | 12/2013 | Warrick et al. | |
| 2014/0267425 A1 | 9/2014 | Moll et al. | |
| 2014/0330542 A1 | 11/2014 | Subramanian et al. | |
| 2014/0330783 A1 | 11/2014 | Provencher et al. | |
| 2014/0379112 A1 | 12/2014 | Kocis et al. | |
| 2015/0244884 A1 | 8/2015 | Sensu et al. | |

OTHER PUBLICATIONS

"New Release of Aspen Plus® Software Delivers an Innovative New Interface and Opens Process Simulation to a Wider Range of New Users", Mar. 6, 2012, PDF downloaded from http://www.aspentech.com/_ThreeColumnLayout.aspx?pagcid=2147485680&id=15032385734, (3 pages) on Apr. 29, 2013.

"New Release of Aspen PIMS™ and Aspen Petroleum Scheduler™ Software Improves Collaboration Between Refining Planners and Schedulers", Mar. 6, 2012, PDF downloaded from http://www.aspentech.com/_ThreeColumnLayout.aspx?pageid=2147485680&id=15032385732, (2 pages) on Apr. 29, 2013.

"New Release of aspenONE® Software Enables Process Engineers to Display Real-Time Data on Simulation Flowsheets for the First Time", May 14, 2012, PDF downloaded from http://www.aspentech.com/_ThreeColumnLayout.aspx?pagcid=2147485680&id=15032386067, (2 pages) on Apr. 29, 2013.

"Version 8.4 of aspenONE® Software Expands Activation Capability to Optimize Energy, Economics, and Heat Exchanger Designs", Nov. 25, 2013, PDF downloaded from http://www.aspentech.com/_ThreeColumnLayout.aspx?pageid=2147485680&id=15032390879, (3 pages) on Mar. 11, 2014.

Pillai, et al., "Development of Supervisory Control and Data Acquisition system for Laboratory Based Mini Thermal Power Plant using LabVIEW," International Journal of Emerging Technology and Advanced Engineering, (ISSN 2250-2459, vol. 2, Issue 5, May 2012).

Hashiguchi, et al, "Wide-area Integrated SCADA System Designed to Improve Availability and Flexibility," Hitachi Review, vol. 60 (2011), No. 7, p. 399.

"AspenTech Announces Availability of aspenOne® V8 Process Optimization Software", Dec. 10, 2012, PDF downloaded from http://www.aspentech.com/_ThreeColumnLayout.aspx?pageid=2147485680&id=15032387367, (3 pages) on Mar. 11, 2014.

U.S. Appl. No. 14/101,216, filed Dec. 9, 2013, "Activated Workflow".

"New Assay Management Functionality in Aspen PIMS™ Software Optimizes Crude Purchasing Decisions and Increases Profitability," Aug. 27, 2012, PDF downloaded from http://www.aspentech.com/_ThreeColumnLayout.aspx?pageid=2147485680&id=15032386682, (2 pages) on Mar. 11, 2014.

U.S. Appl. No. 14/187,958, filed Feb. 24, 2014, "Achieving Stateful Application Software Service Behavior in Distributed Stateless Systems,".

U.S. Appl. No. 29/550,221, filed Dec. 31, 2015, "Display Screen With Graphical User Interface,".

* cited by examiner

APPLIED CLIENT-SIDE SERVICE INTEGRATIONS IN DISTRIBUTED WEB SYSTEMS

BACKGROUND OF THE INVENTION

Computer application programs have evolved from stand alone operation to operation through various computer network configurations. Computer networks have further developed from LAN or WAN (Local or Wide Area Networks) to Global networks such as the Internet. As an outgrowth, web and cloud computing along with software as a service (SAS) came into existence.

Web applications and related computing platforms are not without limitations and disadvantages generally speaking Some challenges faced by web applications include latent communication, weak presentation layer, access via devices, and a lack of standards and/or adherence to standards. Various improvements, in particular in supporting enterprise services in web applications are desired.

SUMMARY OF THE INVENTION

Making use of enterprise services in modern web applications presents challenges that can be overcome through strong graphical user interface (GUI) paradigms that are congruent with technological limitations. The key behaviors to be provided are monitoring, application, control and release of the services or application instances running as services that roughly map to the lifecycle of a stateful service session. Although widely applicable, this pattern is especially valuable when the services exist as a finite pool of resources that can be consumed, even if only temporarily so.

Embodiments aptly provide user selectability of services/application instances. By "aptly provides", Applicant means presenting or otherwise rendering indications of proper (context compatibility-wise) services/application instances and timely (availability-wise) displaying the same.

Embodiments of the present invention provide a method and an apparatus to manage enterprise services and application instances running as services. Embodiments employ a visual representation such as a context-sensitive icon to indicate to a user compatibility (including contextually) and availability of one or more services or application instances running as services with currently active work. Context of the currently active work is monitored. Appearance, disappearance and re-appearance of the context-sensitive icon changes based on the monitored context of the active work. Embodiments use a near real-time indicator to indicate availability of one or more services or application instances running as services. The near real-time indicator indicates such availability to a user by using different states of the context-sensitive icon. Upon user selection of the icon indicating an application instance that is both contextually compatible and available at the moment, embodiments apply the corresponding service (i.e., the service associated with the application instance) to the currently active work. Use or application of the service to the currently active work by one user changes the indication of availability of the service by changing the state of the corresponding icon for other or subsequent users. For example, embodiments change the icon from a first state (indicating that the in-context compatible service/application instance is available) to a second state indicating that the service/application instance is unavailable. The service can be released by a single user gesture in the graphical user interface of the active work area.

Embodiments of the present invention provide a method, a computer system, and a computer program product for managing services. Embodiments aptly provide, in a web application, user selectability of a contextually compatible service as the service becomes available. To accomplish this, embodiments monitor context of currently active work in the web application. Based on the monitoring, embodiments produce a visual representation of a respective icon for each contextually compatible service in a graphical user interface (GUI) displayed in the web application. Embodiments timely indicate availability of the service using different states of the icon. For example, a first state of the icon indicates availability of the service, and a second state of the icon indicates unavailability of service. A user selects the icon corresponding to an available and contextually compatible service to be applied to the currently active work in the web application. Upon application of the corresponding service to the currently active work, the indication of the availability of the service is changed, i.e., the corresponding icon is changed to the second state. After the service has been applied, the corresponding service may be released in response to a single user gesture in the graphical user interface of the web application. In some embodiments, the computer system includes a service management module.

In some embodiments, each icon or service badge is context-sensitive.

In example embodiments, the icon is displayed illuminated in color in the first state indicating that the corresponding contextually compatible service is available.

In example embodiments, the icon is displayed dimmed or grayed out in the second state to indicate that the corresponding in-context compatible service is unavailable.

In some embodiments, the icon is displayed in a third state, in alternative views, or in a different panel (palette) during consumption of the corresponding service. In some embodiments, the third state suppresses display of the icon.

In other embodiments, the user is part of a user group of at least one user. In preferred embodiments, the user group is an enterprise system user group, and the user is an enterprise system user.

In example embodiments, the web application is a process engineering application. In preferred embodiments, the web application is part of a loosely connected system of web applications such as an enterprise service system. For example, the system of web applications may be the aspenONE (Trademark of Assignee) system.

In some embodiments, the corresponding service is a simulation modeling service or a live plant data service.

In embodiments, the respective icons of the one or more compatible services are displayed in a service activation bar area (for initial user selection) of the graphical user interface. The icon is dimmed or illuminated (or otherwise changed between first and second (or other different) states) as a function of changing availability of the respective service. In some embodiments, the user selects the icon corresponding to an available and in-context compatible service to be applied to the currently active work in the web application, and the respective icon of the corresponding service is suppressed, removed from, disappears from, or is not displayed in the service activation bar area.

In other embodiments, an indication of the user-selected icon is displayed in a service panel area signifying that the corresponding service is currently being applied to the active work in the web application. In preferred embodiments, the service panel area is decoupled from the application instance that consumes the service.

In some embodiments, the single user gesture to release a corresponding service is any of: a user operating a displayed close box, or the user dragging and dropping an icon or indication of the corresponding service to a certain area in the graphical user interface.

A computer system implements the foregoing features and methods by comprising a digital resource manager and a service assembly. The service assembly is formed of a resource adapter, a service platform and a resource agent service (each detailed below). The digital resource manager is operatively coupled to the service assembly in a manner that aptly provides in a web application, user selectability of a contextually compatible (i.e., pertinent) service as the service becomes available.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
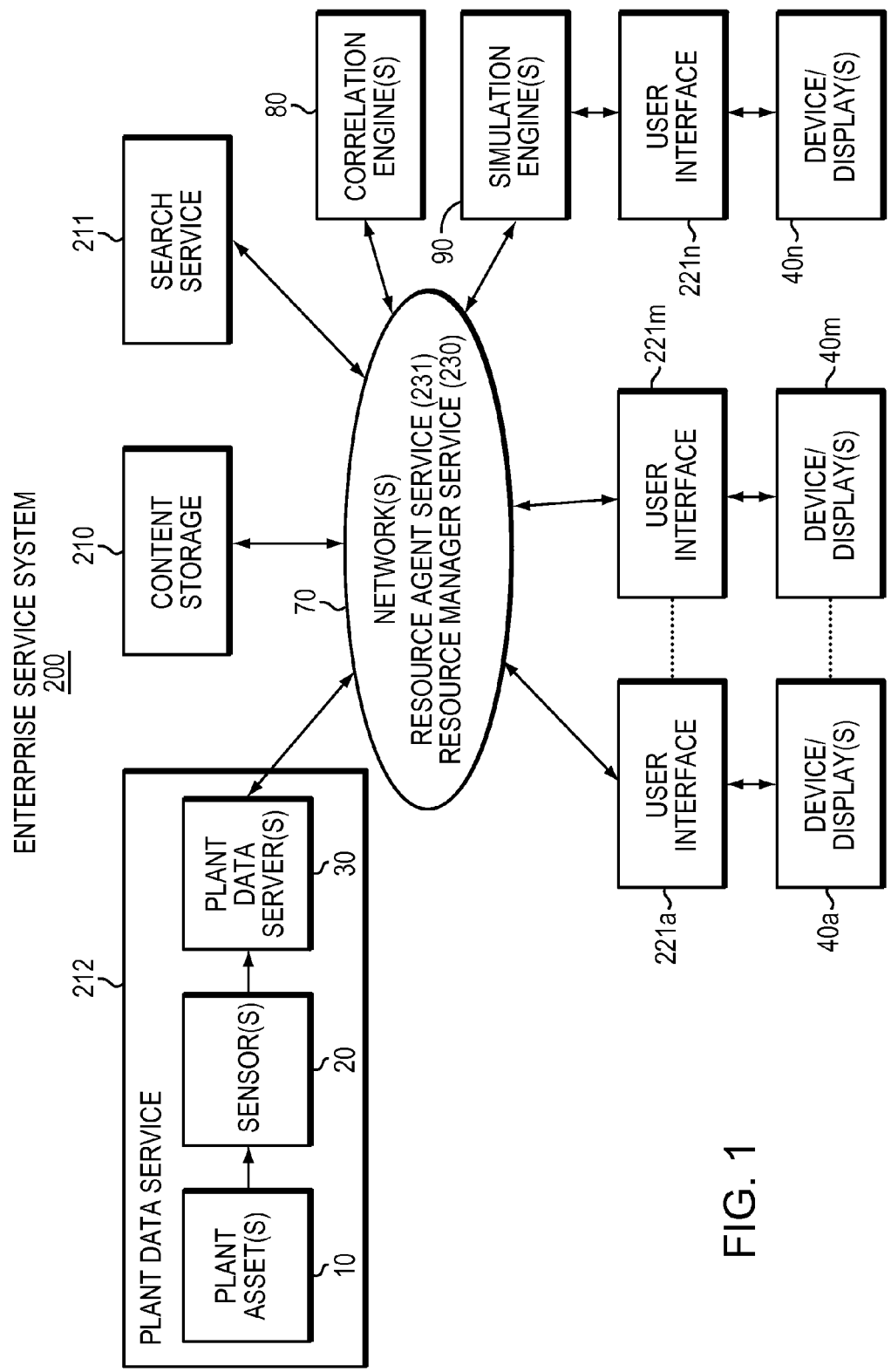
FIG. 1 is a schematic view of an example of a computer processing system embodying the present invention.

FIG. 1 is a schematic view of a computer processing system (also referred to herein as an enterprise service system) 200 in one embodiment of the present invention. In a non-limiting example, the computer processing system 200 manages plant data in the chemical or processing industry. In an embodiment, each element in FIG. 1 may be implemented in software, hardware, or both, where each element is executed through a computer processing means. Each FIG. 1 element may either be in the same geographic location, or in a different geographic location, compared with other elements. In FIG. 1, each element may be either plural or singular.

FIG. 1 illustrates an example embodiment of a plant data service 212 for the chemical industry that includes a plant asset 10 being monitored by a sensor 20, and a sensor recording a plant measurement of plant data to a plant data server 30. For example, the assets 10 of a processing plant may include, but are not limited to, distillation columns, pumps, valves, heat exchangers, evaporators, boilers, and other assets.

A simulation engine 90 may perform a simulation on a simulation model from a set of simulation models of a planned design specification. The simulation engine 90 produces simulation data. The simulation data (from 90) and plant data (from 212) may be received through the network 70 and passed to a correlation engine 80. The correlation engine 80 may correlate the simulation data and plant data and may output the correlated data through one more user interfaces 221 (where 221 includes at least 221a, 221m, 221n) to one more displays 40 (where 40 includes at least 40a, 40m, 40n), as show in FIG. 1. Note that the display 40 is accessible over the network 70, for example, with "Progressive Visual Collaboration" provided by aspenONE (Trademark of Assignee) and the display is accessible locally by the simulation engine 90 (as in Aspen Search, Trademark of Assignee). Through the network 70, which also may function as a system controller, the system 200 preferably includes Content Storage 210, a Search Service 211, a Resource Manager Service 230, and a Resource Agent Service 231. Multiple users all have access to provide input, across different geographic locations through the network 70.

Figure 2A:
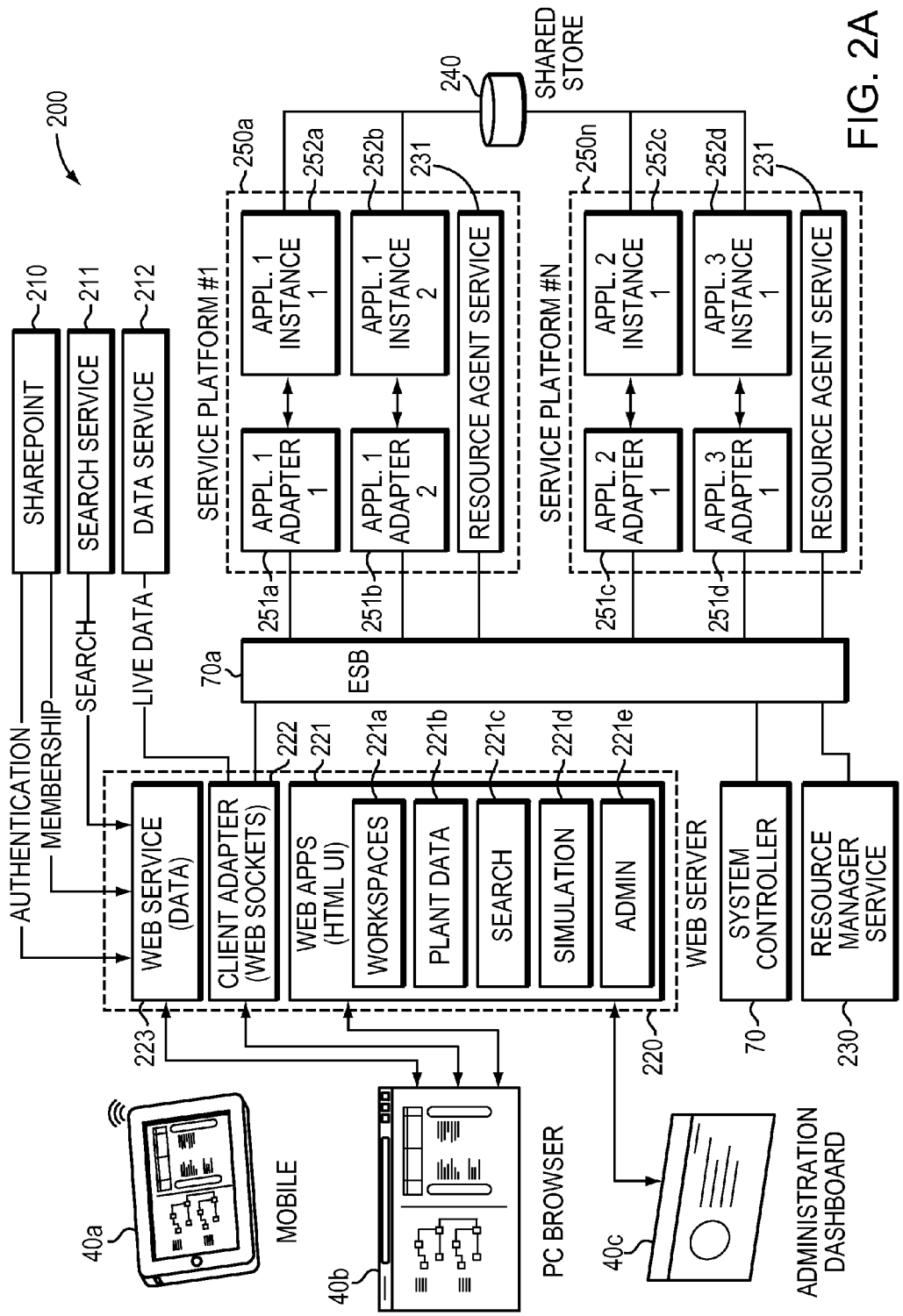
FIG. 2A is a schematic diagram of a preferred detailed architectural implementation of embodiments of FIG. 1.

FIG. 2A is a preferred detailed architectural implementation diagram of an embodiment of the invention, for example, enterprise service system/computer processing system 200 of FIG. 1. In a preferred embodiment, each element in FIG. 2A may be implemented in software, hardware, or both, where each element is executed through computer processing means. Each element may either be in the same geographic location, or in a different geographic location compared with other elements. In FIG. 2A, each element may be either plural or singular.

Figure 3A:
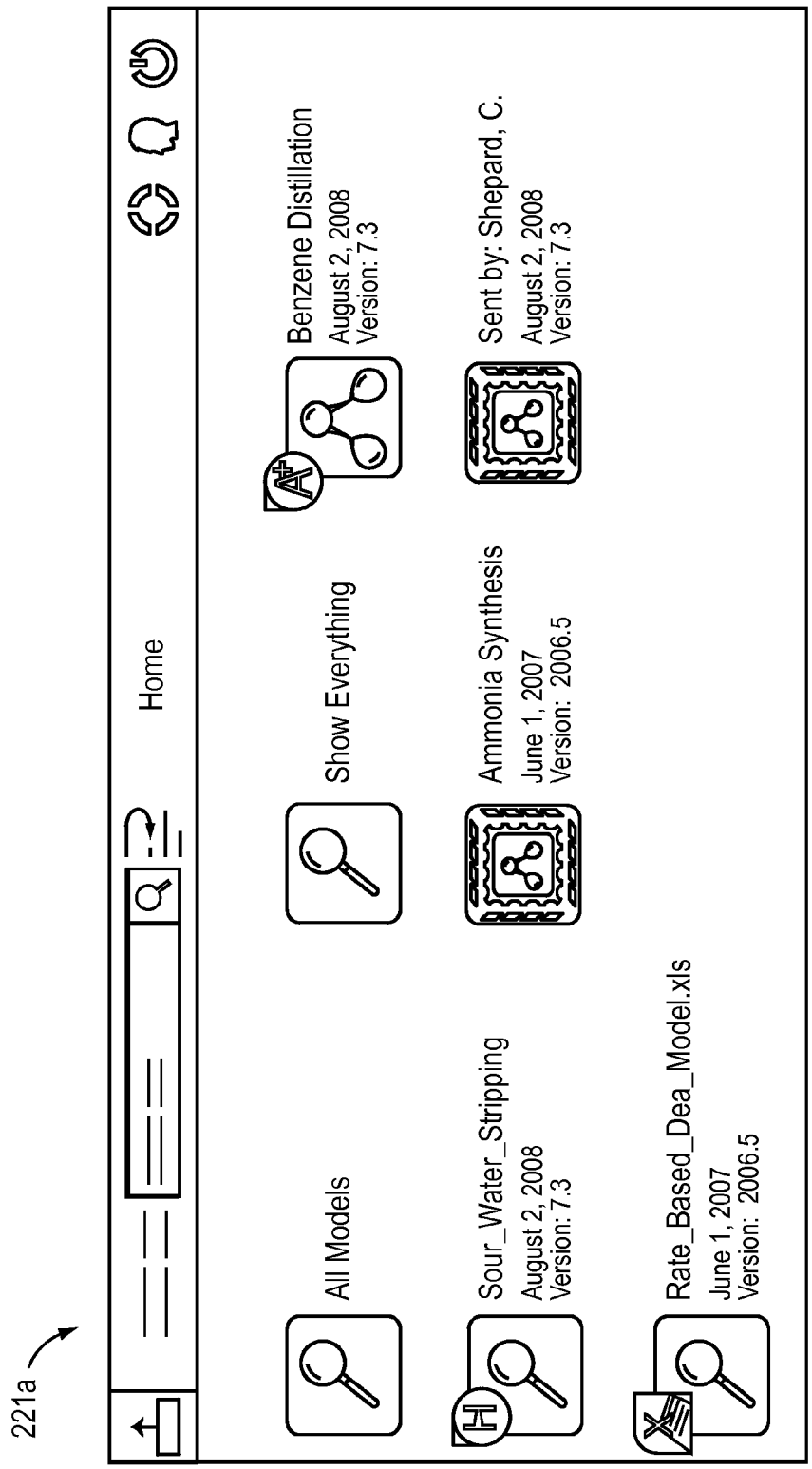
FIG. 3A is an example view of a Workspace User Interface in embodiments.
Figure 3B:
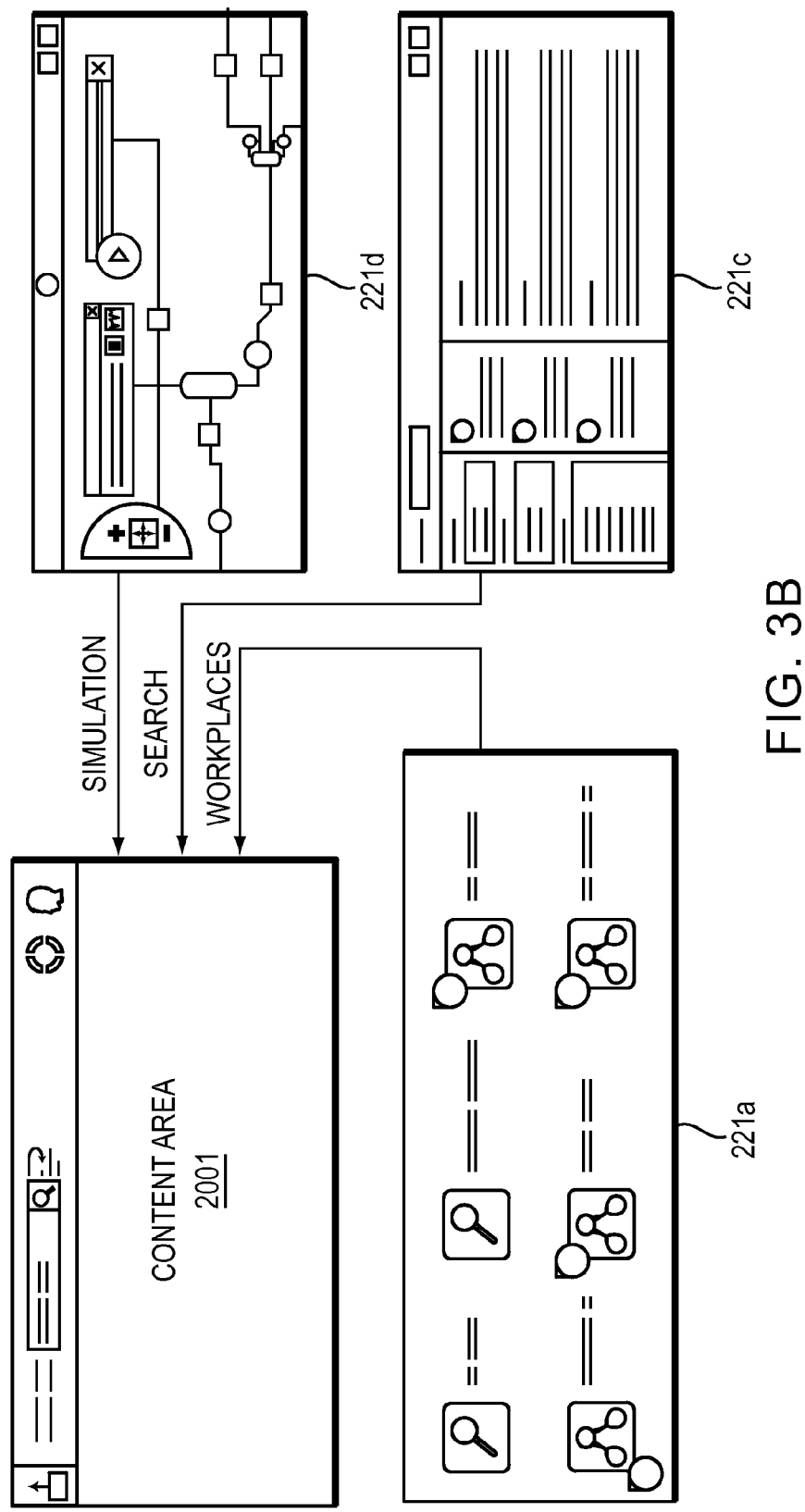
FIG. 3B is an example view of an overview of the infrastructure of a Web Application in embodiments.

The preferred Content Storage 210 implementation is Microsoft Sharepoint; however, embodiments of the present invention may also use other content storage implementations in place of Microsoft Sharepoint. The Content Storage 210 is used to store information including user profile information, authentication information, and membership information, that is communicated to the user through a Web Service (Data) 223 to a computer display 40 for the user, where the Web Service may optionally be included in a Web Server 220. The computer displays 40 (where 40 at least also includes 40a, 40b, 40c, 40m, and 40n), shown in FIG. 1 and FIG. 2A, include but are not limited to a computer monitor, personal computer, laptop, desktop, phone, smart phone, mobile phone, projection device, or other computer (digital processing or computing) device. In some embodiments, the computer display includes a display screen. The user is provided with Web Applications that include User Interfaces (UI) 221 that at least include Workspaces 221a, Plant Data 221b, Search 221c, Simulation 221d, and Administration 221e, where the UIs may optionally be included in a Web Server 220. The UI is implemented in Hypertext Markup Language (HTML) but alternative implementations may be used. Each user can build desired functions to create a unique combination of services instead of, for example, one software product per service. The service including an application instance running as a service may apply business logic allowing the user to choose functions and a unique combination of services to meet the user's needs. The application may allow for presentation and use application logic, which picks and chooses services and determines function integration for the application. In some embodiments, the UI is a graphical user interface (GUI). Workspaces 221a have a unified user interface that allows the user to store, for example, the search result, modification changes, snapshots of plant data, and merged views of plant data. FIG. 3A illustrates an example view of a Workspace UI 221a. In addition, embodiments of the invention include an infrastructure, for example, aspenONE (Trademark of Assignee), that provides capabilities for simulation, search, workspaces, and other UIs into a single content area 2001, as shown in FIG. 3B.

For example, a Search UI 221c allows the user to search, through a Search Service 211, for both actual real-time processing plant operation status data and process design specification data. The Search Service 211 software may extract metadata from the simulation model files, and plant data, and indexes that data into the search.

In embodiments, sensors 20 perform plant data measurements from plant assets 10 and report the plant data measurements through plant data servers 30, for non-limiting example, through an Aspen InfoPlus.21 (IP.21, Trademark of Assignee) data service 212. The "Live Data" in FIG. 2A may correspond to plant data and may include live data, historical data, and other types of plant data. The plant data may be provided to the Client Adapter (Web Sockets) 222, where the Client Adapter may optionally be included in a Web Server 220. As illustrated in FIG. 2A, live data from the Data Service 212 and simulation data from the Enterprise Service Bus (ESB) 70a are simultaneously input to the Client Adapter 222. The Client Adapter 222 may establish two way communications. The Client Adapter 222 may reduce network traffic and latency. The Hypertext Transfer Protocol (HTTP) headers may be significantly reduced. The Client Adapter 222 may operate continuously.

A Correlation Engine 80 in FIG. 1 may correlate the simulation data and plant data into a set of correlated data. In some embodiments, the Correlation Engine 80 utilizes the Web Service 223, the Client Adapter 222, and the Workspaces Web Application 221a of FIG. 2A in order to correlate the data. However, in alternative embodiments, the Correlation Engine 80 does not require all three elements and may include other elements. For example, Correlation Engine 80 applies techniques that adjust time scale of the simulation data and/or the plant data (or otherwise time synchronizes the data) to form correlated data. The plant data and simulation data together may form the correlated data which is visually presented to the user through a computer display 40 in a "side-by-side" manner, which means that the plant data and the simulation data may be together, concurrent, time synchronized, streaming, visually corresponding, correlated, overlaid, contiguous, side-by-side, neighboring, adjoining, adjacent, juxtaposed, or associated in nature, or form a nexus.

The simulation data is received by the Client Adapter 222 as follows in embodiments of FIG. 2A. The Client Adapter 222, on behalf of the user, requests an available simulation resource from the Resource Manager 230. This request is the result of applying a Simulation Service as part of the Service Platform 250 (for example, 250a . . . 250n) to a model that the user is viewing in the Simulation Application 221d. If the requested application instance 252 running as a service is available and contextually compatible, represented by the Resource Adapter 251, the request is granted by the Resource Manager 230. If the requested resource is not available, the Resource Manager denies the Client Adapter's request. The Client Adapter 222 may then use turn-taking and wait for an available resource. A binding identification is assigned from the Resource Manager 230 and held by or communicated to the Resource Adapter 251a (and, in some embodiments, to the Client Adapter 222). The communication of the binding identification leads to the activation of Resource Adapter 251a through the Resource Agent 231, and the application instance 252a running as a service associated with Resource Adapter 251a is added to the bound pool. A binding allows for exclusive use of the resource such as the application instance 252a running as a service by a user. An associated application instance 252a running as a service can then be established or activated by a command from the Adapter 251a. Access to a simulation resource in Service Platform 250 is provided, and a request is performed through the Enterprise Service Bus (ESB) Network Element 70a which forwards requests to the Service Platforms 250a . . . 250n (generally 250) through the Resource Agent Service 231 to obtain a simulation resource. Within one or more instances of Service Platforms 250, the simulation resource may include one or more instances of Application 1 252a, 252b, one or more instances of Application 2 252c, one or more instances of Application 3 252d, or other types of simulators or application instances running as services. Multiple simulation resources 252 may have the same UI or separate UIs. In addition, a Resource Agent Service 231 starts and stops Adapters 251 (where 251 at least includes 251a, 251b, 251c, and 251d). In some embodiments, a user may only access one Service Platform module because the resources are fixed and finite. In some embodiments, the Service Platform includes a Resource Adapter 251, an application instance 252, and a monitor. The components of the Service Platform may work together to provide functionality in the system of one application instance. In some embodiments, the Resource Agent 231 acts as a service for the whole machine running all of the platforms associated with the machine. The Resource Agent 231 may start and stop Adapters 251 when the machine starts up.

In this way, embodiments employ a service assembly formed of at least the resource adapter 251, service platform 250 and resource agent service 231. The service assembly, through resource manager 230, aptly (as proper, pertinent and timely) provides user selectability of one or more services to web applications 221 as further made clear below.

A resource such as an application instance running as a service that is checked out and running may consume license tokens. In some embodiments, a service may consume a resource such as an activation key or a key code such that the resource is no longer available. More supplies or resources may be purchased to restock the Service Platform or the System. In embodiments, the Resource Adapter 251 acts as a lightweight proxy that will launch application instances running as services only as needed, which may minimize consumption of resources and computing power. While the resource such as an application instance running as a service is exclusively checked out to the user, stateful information keyed to previous user tasks and needs may be called into the application instance running as a service.

An Adapter 251 is associated with each Application Instance 252 running as a Service Instance. The Adapters 251 adapt application-specific settings and instructions between software languages, and the Adapters 251 control the application instance 252 running as a service and handles communication between the application instance 252 running as a service and the Client Adapter 222, the Resource Manager 230, and the corresponding Resource Agent 231 as shown in FIG. 2A. The Adapters 251 are also used to provide a connectivity mechanism to the ESB 70a for a given instance of a simulator or application 252. When the simulation instance or application instance 252 running as a service and the corresponding Adapter 251 are activated, then simulation data or application data from the shared store 240 may be transferred through the ESB 70a to the Client Adapter 222.

Once a simulation resource is established, the Client Adapter 222 has exclusive access to the simulator. Note, multiple simulators or applications may be used, but this fact is transparent to the user. Based on request parameters and/or other input from Resource Manager 230 and Client Adapter 222, the system knows which type of simulator or application is required and automatically interacts with the correct one. In some embodiments, if a deployment or service platform does not have a specific simulator or application installed, the specific simulation or application instance running as a service is preferably not seen in the dynamic Service Bar (such as 21 in FIG. 4A). The Service Platform 250 sends replies and other messages to the Client Adapter 222 that the application 252 publishes for the client to read. The Service Platform 250 may provide push notifications from the Services or Application Instance 252 running as a service. The Service Platform 250 may provide smaller, faster, and more focused messages.

Note that data from the shared store 240 may include any user-driven data meant for sharing. Note that both the Service Platforms 250 and the data from the shared store 240 are not limited to simulation, and other types of applications 252 using other types of Service Platforms data from the shared store 240 may be used, such as, but not limited to, files, models, application models, process control, planning, scheduling, manufacturing, accounting, manufacturing supply chain (MSC) products, supply chain logistics, anything that requires automation in a plant or process, anything that performs processing of crude oil, or other types. In addition, as shown in FIG. 2A, multiple service platform instances (modules) 250 may be used and multiple application instances 252 running as a service may be used. Example Application Instances running as Service Instances include Aspen Plus (Trademark of Assignee) and Aspen HYSYS (Trademark of Assignee for Hydro Carbon Simulation System), which each provide a comprehensive process modeling system, and PIMS (Trademark of Assignee for Process Information Management System) provides a planning and optimization solution. Note also that the simulation resource may also include both the Adapter 1 251a and the corresponding Application 1 Instance 252a and may optionally include a Monitor 1, which is started by Adapter 1 251a. The simulation resource has access to the Shared Store of simulation model information 240, so the Client Adapter 222 may retrieve simulation data.

Referring back to FIG. 2A, the application instance 252 running as a service has access to the Shared Store of simulation model information 240, so the Client Adapter 222 may retrieve simulation data. The Resource Agent 231 runs locally on a simulation service server (supports 250). The Resource Agent 231 starts and stops Adapters 251 (where 251 at least includes 251a, 251b, 251c, and 251d) based on configurations and commands, which may be changed at runtime. At startup, the Resource Agent 231 reads its configuration and starts the appropriate number of Adapters 251 which may be implemented as Application specific Adapters. The Adapters 251 may be implemented as Aspen HYSYS (Trademark of Assignee) Adapters, Aspen PIMS (Trademark of Assignee) Adapters, Aspen Plus (Trademark of Assignee) Adapters, and/or other types of Adapters. The Adapters 251 initialize and register with the Resource Manager 230. In some embodiments, the Adapter registration is dynamic based on the instructions received by the Resource Agent. The Resource Manager is visible system-wide and may not know the physical location of each adapter. The Resource Agent 231 has a license to kill (stop) any service process (if tasked by the administrator) to keep the machine clear of hanging, slow, or otherwise misbehaving service threads. In one embodiment, the "Application" Service Lifecycle is designed to mimic the Desktop Lifecycle, although one skilled in the art may realize that other computer lifecycles may be used. As such, the Resource Adapter 251 is a proxy for the desktop user and starts and stops the application 252 to help ensure stability and to guard against side-effects.

The following is a further explanation of Resource Management from the Client View (generally at 40, 221, for example, of FIGS. 1 and 2A). To a system client 40, there is a mechanism for sharing a limited set of resources across a group of people such as enterprise users where access is exclusive for the period of time that it is in use depending on availability. For example, the enterprise service system will be configured to have a specific number of simulators available, which depends on the topology or structure and hardware deployed for the whole system or network. The topology may be distributed. In embodiments, a master copy of the simulator may exist. The master copy acts as a template, which may be copied to a local directory. All enterprise users may share the pool of simulators, and if a simulator is available, a user may "check out" or use a specific copy of the simulator. No two enterprise users will be using the same simulator simultaneously or at the same time, so a user's use of a specific copy of the simulator is exclusive during the period of check out. In some embodiments, the service such as a simulator may be dedicated to the user and retain memories of user needs, tasks, events, etc. of a stateful service session. In some embodiments, the resource may be assigned to another resource or process. For example, a scheduling service may be used to bind an application instance 252 running as a service through its Resource Adapter 251 for use at a particular time. In some instances, all simulators available in a given enterprise service system 200 are deployed or checked out so that none are available at that moment in time to a specific enterprise user.

For example, the enterprise service system 200 and process of Resource Management works a lot like bowling. Shoes are limited resources that require exclusive access; while the enterprise user is playing, no one else may use them. A representative assigns a pair of shoes in exchange for something a user wants back, like a driver's license (or tokens). When the user finishes, the user returns the shoes to a trusted third party, and after some housekeeping, the shoes become available again and someone else may check them out. In embodiments of Web Application (Web App) 221, the trusted third party is the Resource Manager 230, and it oversees a system that is a bit more complex. Like a taxi cab dispatcher, the Resource Manager 230 knows how many cabs are available, how many have riders and how many are "out of service." An enterprise service system 200 may provide manageability to the system. The enterprise service system 200 may serve many users in a scalable way. For example, the enterprise service system may scale from 25 users to 100 users to 10,000 users.

The Resource Manager 230 also monitors compatibility. Compatibility implies that a given service or resource somehow enhances the existing work, such that new value is created or existing value is released. Some services are contextually compatible with the current work. Compatibility and availability tell a user what services or resources "could be applied" to current work, providing that it is available. For example, as pieces or modules are added to the Service Platform module 250, the new piece or module may include additional services, resources, and applications not previously available. Such systems are dynamic and may easily adjust if there are problems. An advantage of the Resource Management system includes its dynamic nature due to the modularity of the system. The Resource Management system is also configurable.

Referring back to FIG. 2A, the Resource Adapter 251 is a smart proxy and handles all system interaction on behalf of the Application Instance 252 running as a service. For example, upon initialization, the Resource Adapter 251 registers the Service with the Resource Manager 230. In embodiments, the Resource Adapter 251 lets the Resource Manager 230 know that the Resource Adapter 251 is available to work if needed, and the Resource Adapter 251 runs as a lightweight proxy waiting for a call when not actively servicing requests. By running the Resource Adapter 251 rather than running a Service in perpetuity, the system 200 has greater stability. Software, application instances, and services can have problems, especially instability, when they are constantly running. The Resource Adapter 251 may have a lifespan of the lifetime of the system. The Application Instance 252, which is run as a service as needed, may have a lifespan corresponding to the time of binding and starting until the time of release and stopping. The Resource Adapter 251 controls the lifespan of the Application Instance 252 running as a service by starting and stopping the Application Instance 252 as needed. The Resource Manager 230 preferably does not require a priori knowledge of the Adapter 251. This high level of decoupling makes a system 200 very dynamic and scalable.

The Resource Adapter 251 preferably services user requests after it has been assigned to a specific client; the assignment process is called "binding" and includes a binding identification or binding ID that drives dynamic routing. The binding ID is held by both the client and the Adapter 251. A bound Resource Adapter 251 begins to receive user requests for processing and spins up an instance of the application 252, which checks out tokens. As with any other System Service 250, the Adapter 251 publishes responses, System Events and Notifications via messaging.

The Resource Adapter 251 functions as a proxy for the Service 250 and when not actively servicing requests, the Service instance preferably does not exist. When the Application Instance 252 running as a service is brought into being by Adapter 251, communication occurs via a Case Execution Service (CXS). This pattern allows the Resource Adapter 251 to continue to participate in Automation, System Management and Administrative functions. The Adapter is a stand-alone system component and like all components, preferably providing regular status reports to the Resource Manager even if there is no application currently running Once connected to the messaging backbone, which is a component of ESB 70a, the Resource Adapter 251 provides Service Access 250 by receiving requests, publishing events, responses and notifications on behalf of itself and the application instance. Adapter (251)/Application Instance (252) communication may occur via CXS which includes but is not limited to, an application programming interface (API). The Adapter 251 may include control logic and may send commands through the CXS to the Application Instance 252 to load, run, query, or otherwise handle the model. The messaging backbone may use the Advanced Message Queuing Protocol (AMQP). Other communication services, protocols and programming languages may be used to implement the System messaging backbone.

The Adapter may terminate, restart, or repair the application instance running as a service. In some embodiments, the Adapter shuts down or terminates the Application Instance running as a service when the Application Instance is no longer needed, and the temporary files associated with the Application Instance running as a service are cleaned up or removed. The computer-implemented method may include a secondary process (a monitor) that monitors the Adapter. In the event that the Adapter dies, the monitor will terminate the running application instance and itself. In embodiments, the monitor monitors (runs a monitor process of) the state of the Resource Adapter 251 and optionally the state of the application instance 252 running as a service. In embodiments, the monitor is a small companion process that is launched after the launch of the application instance running as a service. The monitor may detect failures from either or both the Adapter 251 and application instance 252 running as a service, thereby serving as an additional self-healing mechanism. The monitor is given the process identification, which is assigned by the operating system to any process, of both the Adapter and the application instance running as a service. The Monitor holds or stores the process identification of the application instance and the process identification of the Adapter after the application instance runs as a service. In some embodiments, the monitor can stop, kill, end, or terminate based on each process identification and can stop, kill, end, or terminate itself. The monitor acts as a safety to prevent rogue threads, for example, an application instance when its adapter dies.

The computer-implemented method, computer system, and computer program product may include the switchover event including a failover event detected by a loss of one or more periodic heartbeat messages sent from the application instance 252 running as a service to the Resource Manager 230 through a Resource Adapter 251. The computer-implemented method, computer system, and computer program product may include the switchover event resulting from an interrogation command sent from the Resource Manager 230 to the application instance 252 running as a service that fails to respond with an expected acknowledgement. The computer-implemented method, computer system, and computer program product may include the switchover event including intervals of regular maintenance as administered by an administration dashboard. In some embodiments, the loss of one or more periodic heartbeat messages sent from the application instance 252 running as a service through the Resource Adapter 251 to the Resource Manager 230 indicates problems with the application instance 252 and/or the Resource Adapter 251, and the Resource Manager 230 may proactively take action including replacing the problematic Resource Adapter 251 and Application Instance 252 running as a service and moving the problematic Resource Adapter 251 to the dead pool and killing the associated Application Instance 252. The computer-implemented method, computer system, and computer program product may include the service being associated with a new application instance, in addition to being associated with the application instance, and subsequently after detecting the switchover event, the application instance is no longer associated with the service, thereby replacing the application instance identified for removal with the new application instance in a seamless manner, such that a live user service session is not interrupted or modified, wherein a redundant mirrored application instance is applied as the new application instance running as a service. The switchover event may be initiated by human action as opposed to automated logic.

Figure 2B:
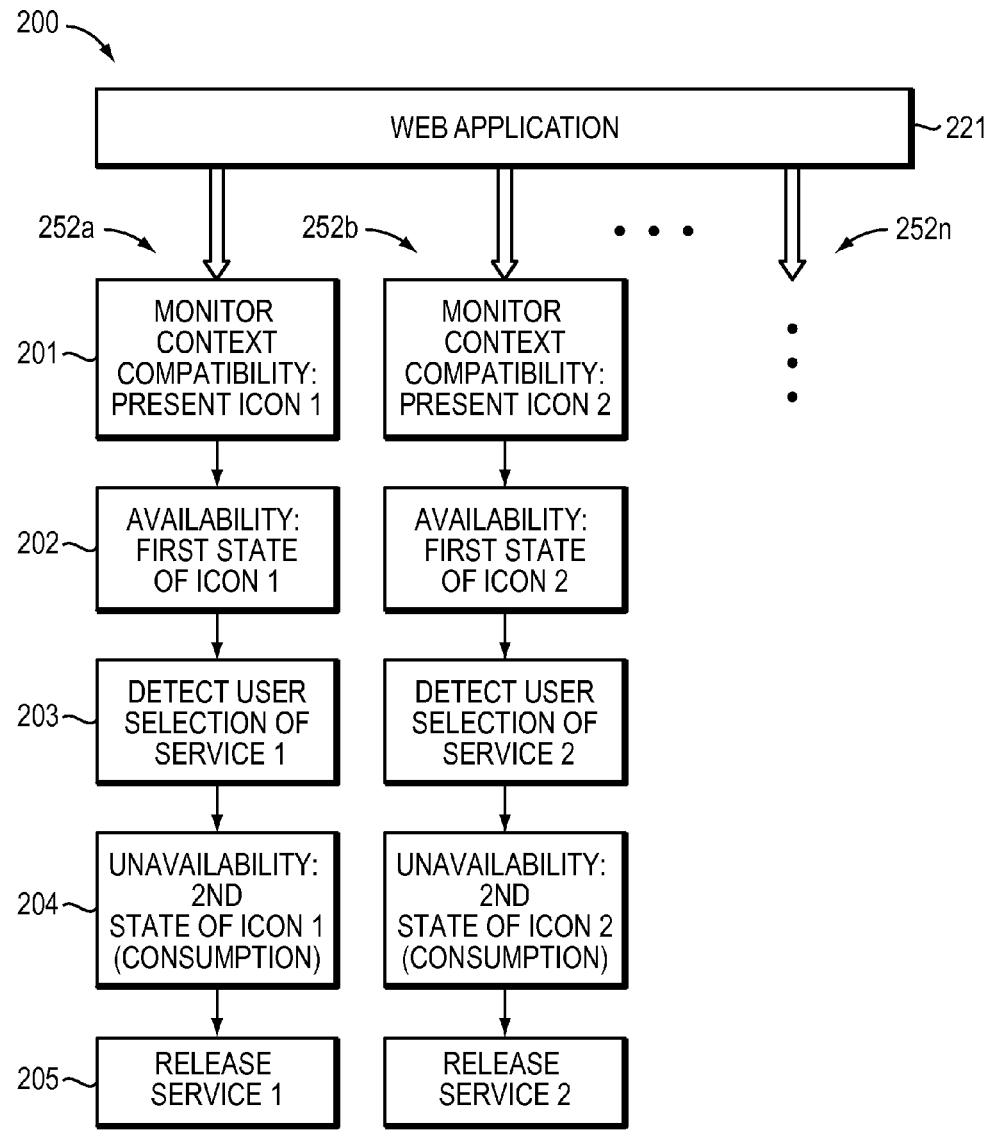
FIG. 2B is a flow diagram of the enterprise service system for managing services in embodiments of the present invention.

Now that context of architectural elements and related terminology is described for FIG. 2A, a summary of enterprise service system for managing services is provided in FIG. 2B. FIG. 2B is used for an illustration of the primary steps of a preferred embodiment 200 of the proposed approach. FIG. 2B depicts the high level flow diagram of embodiments of an enterprise service system 200 for managing services of the present invention. A processor executes Web Application 221. An application instance (generally 252) running as a service may be user selectably integrated into the Web Application 221. The invention system 200 aptly provides, in web application 221, user selectability of a contextually compatible service or an application instance 252 running as a service, as the service becomes or is available. This is accomplished by the system 200 at step 201 monitoring contextual compatibility of a service or an application instance running as a service with the Web Application 221. In particular, step 201 monitors context of current active work in the executing web application 221. Step 201 presents or otherwise displays a representative icon for each contextually compatible service. Generally speaking, overall compatibility with various services may be known early in the development of Web application 221. There is a full set of services that Web Application 221 might potentially consume. Within the workflow of Web Application 221, a portion of the full set of Services (application instances 252 running as services) may not be needed at certain times in Web Application 221, and different unneeded portions of Services may be ignored at different times by Web Application 221. Therefore, in some embodiments, the system 200 includes a Service Bar 21 (FIG. 4A) for presenting respective icons corresponding to a subset of Services pertinent to Web Application 221.

For each application instance 252, step 202 of the invention system 200 indicates the availability of a service by toggling between a first state and a second state of the icon. The Web Application 221 may detect the availability of a Service 252 by passively listening for system messages advertising that the Service 252 is available. In some embodiments, the system messages are one or more periodic heartbeat messages. For a given Web Application 221, the Web Application 221 is designed to listen for the availability of compatible Services. In some embodiments, the availability only is monitored for a subset of Services pertinent to Web Application 221 with respective icons displayed in the Service Bar 21. The set of available services for a pertinent to Web Application 221 corresponds to a subset of services contextually compatible with Web Application 221, not necessarily the full set of Services.

At step 203, system 200 detects the user selection of an icon indicating an available and context compatible service, e.g., 252a, to apply to the Web Application 221. In response, step 203 applies the corresponding service 252a to the Web application 221, and step 204 changes the availability of the applied service 252a by changing the respective icon to a second state to indicate unavailability of the associated service 252a. In one embodiment, step 204 also supports various indicative screen views showing the icon in a third (or other) state(s) indicating consumption of the corresponding service 252a. At step 205, the application instance 252a running as a service is released by a single user gesture in the graphical user interface of Web application 221.

An embodiment of the proposed approach applies non-destructive editing in software models and files. One advantage of an embodiment of the proposed approach is that non-destructive editing means that multiple users may make changes to the same file without having one user's changes overwrite another user's changes. This is accomplished by coding the plant processing software or simulator, such as aspenONE (Trademark of Assignee), to "remember" the changes that a given user makes to a model and stores those changes in a given user's account (of the invention system), where the changes do not affect the other users and all users have their own private set or sets of changes. In the preferred embodiment of the proposed approach, changes are initially private and the baseline model itself is preferably not changed. In one embodiment, a single user may merge or share his sets of changes to a model. In an alternative embodiment, users may merge or share changes to a model instead of employing a private change approach. A given user may receive a copy of the other user's changes or gain access to such changes as part of a collaborative workflow, which is also embodied in the invention. In an example scenario, loading the original model file and reapplying the changes restores the user's state and lets the user pick up where the last user left off, and in example embodiments, the user and the last user are the same user. Recovery from a critical failure in a simulator is preferably similar to starting over where opening a saved simulation triggers the process software or simulator to pull the user's modifications from the user's account and applies the user's modifications to the baseline model, thereby restoring the state. In addition, additional unsaved changes (not saved in the user's account) held in computer memory (working memory generally) may be retrieved for the user and these unsaved changes are also included as part of the saved modification set.

Another advantage of an embodiment of the proposed approach includes an advanced concept of autonomous self-healing where the system components detect simulator failure conditions and take pro-active steps behind the scenes by assigning a new simulator, while attempting to recycle the failed instance. The system loads the data and reapplies the changes that were in effect when the failure occurred, for example, when the Application Instance running as a Service Instance fails but the Web Application remains viable. In one embodiment of the proposed approach, this autonomous self-healing is performed before a user is aware of a problem with the simulator.

Another advantage of an embodiment of the proposed approach is an improved change management strategy compared to existing change management strategies. Existing change management strategies apply source control (such as Clearcase and CVS) to change files, through multiple users, and the file changes result in different versions of a baseline, that are stored in a repository. In existing systems, the latest baseline version of the file is comparable to a single source of truth. By contrast, an embodiment of the proposed approach provides multiple sources of truth where every user has an independent source of truth. In an embodiment of the proposed approach, individual user preferences and individual user changes are stored in user preference storage (or content storage) and each user may have his own source of truth. Rather than just saving a new baseline for each version, an embodiment of the proposed approach saves the changes relative to an initial/original user baseline, which is more convenient to the user.

Another advantage of an embodiment of the proposed approach is that it includes a user-centric focus. By contrast, in existing source control environments, the focus is repository-centric. An embodiment of the proposed approach includes a focus on the individual preferences and needs of the system developers. In an embodiment of the proposed approach, user deltas and user preferences are saved. By saving user deltas and user preferences, live sessions may be moved to new machines. In some embodiments, the administrative console can migrate to a different machine. Through a Resource Manager Service using Resource Adapters, the system has incredible flexibility and leverages behavior that mimics a user on desktop software in a distributed enterprise system, as a service, without requiring non-trivial modifications to the application code or to alter its workflows in any material way.

Benefits of embodiments of the proposed methods, computer systems, and computer program products for managing services for a user group include displaying Compatibility and Availability information in user interfaces and GUIs including on mobile form factors, PC browsers, and touch-enabled devices. Use of Compatibility and Availability information provides the user with a maximum amount of choices while avoiding confusion and possible frustration when choices leading to functional dead ends, failures, or illegal states are displayed in a UI.

Additionally, using the Service Palette paradigm allows decoupling of the UI elements from the application instance running as a service. The Service Palette increases the ease of introducing new services when the new services may have very different requirements for display and control. Service context indicators including a Global Service Bar, which displays services or application instances running as services currently being consumed by active work, encourages user awareness as the user moves around the system.

Figure 4A:
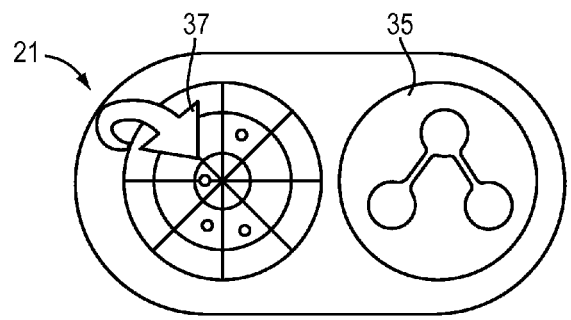
FIG. 4A is an example view of a service bar in embodiments.
Figure 5:
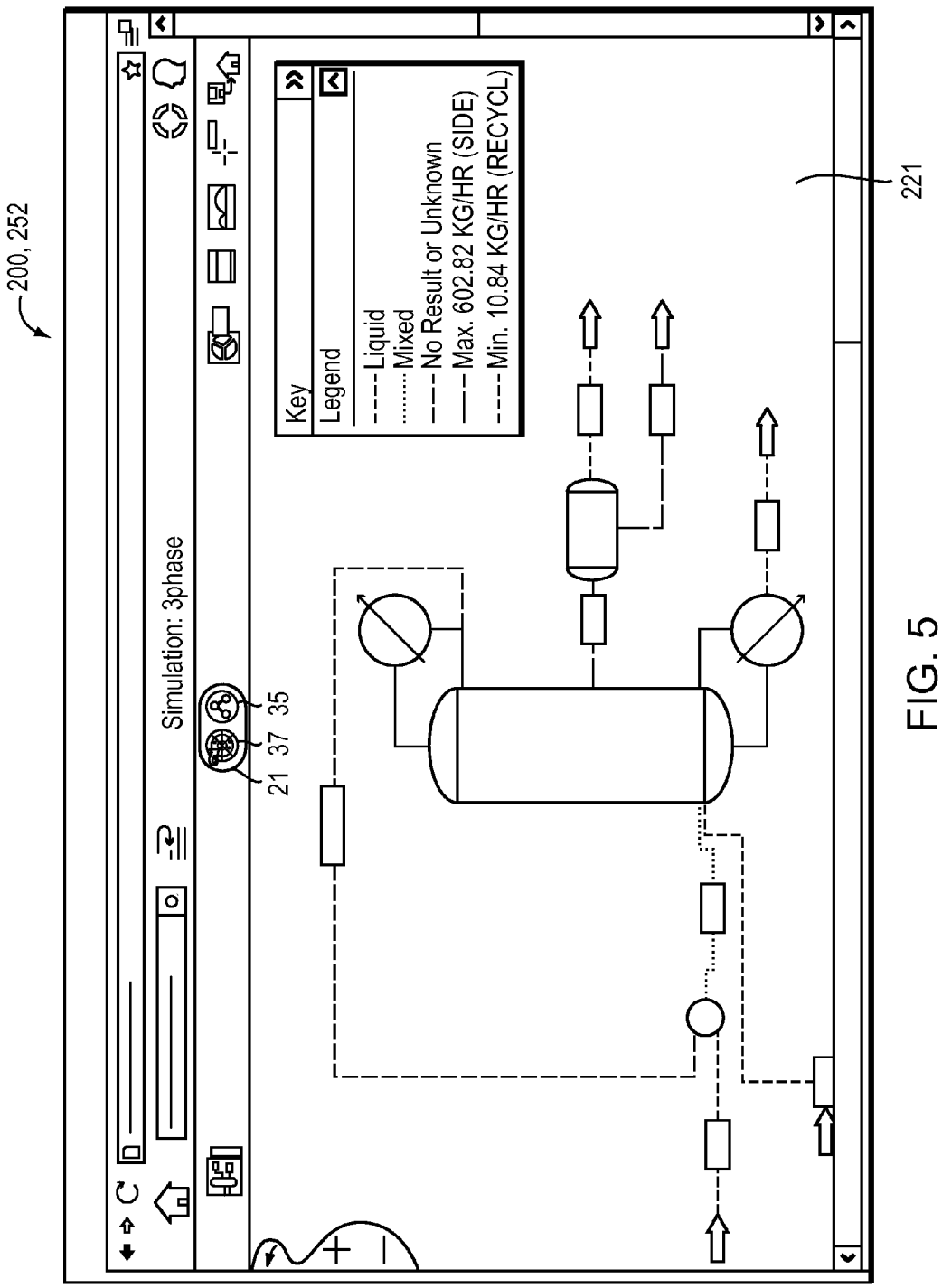
FIG. 5 is a schematic view of a graphical user interface of contextually compatible (pertinent) and available services while viewing a simulation flow sheet in an embodiment.
Figure 6:
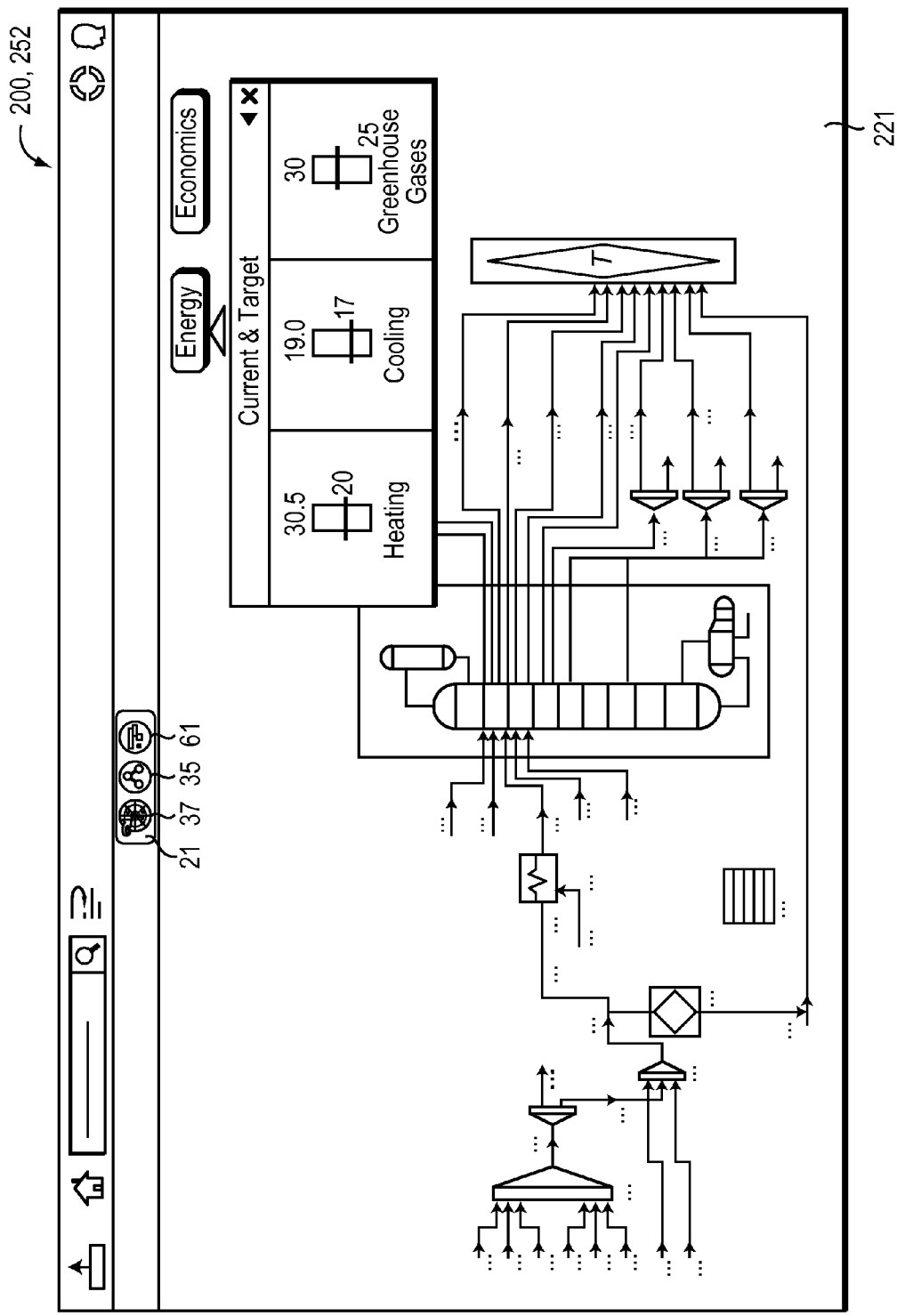
FIG. 6 is a schematic view of a mobile or remote device graphical user interface of contextually compatible (pertinent) and available services while viewing a simulation flow sheet in an embodiment.

Enterprise services and application instances can be represented as additional enhancement capabilities that can be "applied" to currently active work in a Web Application 221. Services information provided to the user fall into two categories: compatibility (including contextual) and availability. Compatibility (in the context of the current active work) implies that a given service somehow enhances the existing work, such that new value is created or existing value is released. In this way, system 200's indications of compatibility (contextual) and availability tell a user what services "could be applied" to current work, providing that it is available. For example, as pieces or modules are added to the service platform 250 or Web Application 221 platform, the new piece or module may include additional services and applications not previously available. Contextual compatibility of services and applications is monitored based on currently active work in a client workspace. Based on the monitoring, system 200 produces, in a graphical user interface, a visual representation of a respective icon for each in-context compatible service or application as illustrated in FIGS. 5 and 6. The icon serves as or provides a selection mechanism that allows a user gesture to transition a service into the application phase, where that service is applied to enhance the current work. The monitoring phase provides contextual compatibility information to the user by a context-sensitive representation of services (i.e., display or presentation of the icon) with a near real-time indicator that provides the second type of information, availability. Being able to see a service visually represented as a respective icon, icon badge, or service badge means that the service is contextually compatible with the current work. In some embodiments, business logic is applied to display respective icons or service badges that are compatible in a context-sensitive manner. Beyond having that visual cue, moving between two detectable states indicates or signifies whether that in-context compatible service is actually available at the moment. In some embodiments, the one or more services involve turn taking (pauses integrated into the services, for example, for specific services or shared resources). In some embodiments, a hidden (not visible) respective icon represents a contextually incompatible service or application instance to apply to the current work. In some embodiments, a respective icon is not displayed in a Service Bar or an Activation Bar 21 (FIG. 4A) when it is being consumed.

Availability of a given service may be represented in a number of ways but in the case of using an icon (service badge), having the icon manifest a visual change can help the user discern between a contextually compatible service that is available and one that is contextually compatible but happens to be currently unavailable. For example, a contextually compatible and available service may be indicated by a respective icon displayed illuminated in color, lit up, or active. In example embodiments, a contextually compatible and unavailable service is indicated by a respective icon displayed dimmed, grayed out, or disabled. Other visual or operational changes between a first state of the icon indicating availability and a second state of the icon indicating unavailability can also be used. A consumption of a context compatible service may result in a third state of the icon. For example, the icon may be suppressed or removed from display or may disappear from the Service Bar 21.

The visual representations of a respective icon for each compatible and available service or application enhance user understanding of contextual compatibility and availability. At a glance, a user can determine which services or applications can be applied to the current work based on visual cues linked to availability and contextual compatibility. An easy assessment of available and in-context compatible resources such as services or applications is useful particularly in distributed enterprise service systems 200 and platforms.

Enterprise services may also be dependent on the availability of finite resources shared across different enterprise users. For example, all enterprise users may share a pool of fifteen simulators. If a simulator is available, an enterprise user may exclusively check out a specific copy of the simulator, for example, displayed as an illuminated icon, to apply to currently active work. Certain enterprise services may be inexhaustible or always compatible. However, in some embodiments, if a user is currently consuming an exhaustible service, only one application instance of that service may be available to that particular user. For example, a user currently applying a service or application instance of an exhaustible service, may have the respective icon disappear from the Service Bar or Activation Bar in the GUI viewable by the user. In some embodiments, a user may use the last application instance of a service, and the resource may be unavailable to all enterprise users until the resource (e.g., service, application instance, activation key, or key code) is restocked for the enterprise service system 200 or platform.

An enterprise service system 200 may be more complex and may become unstable if all software applications are constantly running. In embodiments, a Resource Manager 230 treats instances of Resource Adapters 251 as finite but reusable resources that can be allocated and "bound" to a given user for an unspecified duration. Embodiments allow integration of desktop software in a distributed enterprise system, as a service, without requiring non-trivial modifications to the application code or to alter its workflows in any material way. A Resource Adapter 251 or smart proxy adapts the native interfaces of the application 252 to the common message-based infrastructure of an Enterprise Service Oriented Architectures (SOA). A Resource Manager component is created that serves multiple functions. Some Resource Manager functions include tracking all Adapters that register with it, listening for Adapter regular heartbeat/status messages to detect situations where and Adapter needs to be taken offline proactively, and allocating the limited resources available and that interact with a smart proxy (Adapter).

This Service Paradigm achieves Stateful Service Behavior in what is normally a stateless system. These approaches are not mutually exclusive in that a given architecture can easily support both Stateful and Stateless Services in the same SOA architecture. A stateless service does not maintain any client-specific state. In embodiments, a stateless service allows one instance of a stateless service to serve multiple clients simultaneously without a context switch involving moving data in and out of the service depending on the identity of the client. For example, a stateless service starts from default values without memory or context linked to the user or to the client. In embodiments, some state information, for example, tables and other cached data may be necessary to allow the service to function as designed but may not directly relate to any specific client.

In some embodiments, the resource agent 231 launches the Resource Adapter 251 with configuration information achieving stateful service behavior. A stateful service involves stored information of variables and data from applications at a given time point that may be linked to a specific user. A stateful method or apparatus involves remembering one or more preceding events in a sequence of interactions with a user, another computer, or other outside element. In some embodiments, the stateful service is configured to act like a dedicated service based on a specific user, for example, a user's needs, preferences, and tasks. In some embodiments, the stateful service involves binding certain information to a specific user, for example, information tied to a user's account based on a user's login information to access a system. A stateful method, apparatus or service can be dynamic. In embodiments, the Resource Adapter 251 gets or retrieves configuration information and uses the information to populate parameter values for a stateful service session. In example embodiments, the Resource Adapter 251 uses ΔXML for a method to call for a stateful application instance running as a service with parameter values. Non-destructive editing normally involves a baseline from which a user works and the system maintains a list of changes to that baseline, where a list of changes is preferably referred to as a delta. As the delta evolves, changes to the delta are written to persistent store. In embodiments, viable message formats are used to call for information such as parameter values for the system. In embodiments, the information for the system is in extensible markup language (XML) or ΔXML representing differences from default values.

Finding ways to continue to leverage the value locked up in desktop software is a common challenge among mature software companies in a world where more and more people are working away from a desk. Service Oriented Architectures provide the freedom to create controlled service environments that mimic the usage for which the software was initially designed. In some embodiments, for SOAs to mimic individual software usage, the User Interface may be bypassed with the ability to trigger code paths programmatically. In other embodiments, the ability to trigger code paths programmatically is integrated with the User Interface. In embodiments, the SOAs mimic individual software usage by triggering code paths programmatically and by retrieving the results from that processing to tie that access to a system that can drive that program logic from alternative interfaces.

The respective icon visual representation is based on the context of the underlying transaction (e.g., Web Application 221 transaction or Application Instance 252 applied as a service). In some embodiments, the context of the underlying transaction depends on the current state of the Web Application 221 or Application Instance 252 running as a service. An icon's appearance is based on factors including one or more of the following: Web Application 221 context, Application Instance 252 running as a service, engine stored data 94 (FIG. 9), business logic of the engine routine 92 (FIG. 9), and rules built into the engine routine 92. In some embodiments, the presentation (or disappearance) of the respective icon depends on complex considerations corresponding to different states of the icon. For example, the different states of the icon may include two states; a first state of the icon indicating availability and a second state of the icon indicating unavailability. In embodiments, a third state of the icon may indicate consumption of a Service or Application Instance running as a Service. In other embodiments, the different states of the icon indicated in a graphical user interface displayed in the web application may correspond to more than two different states providing additional or other information to the user.

In some embodiments, the SOA is multithreaded, i.e., contains one or more threads. In embodiments, the services may be run in a serial sequence or in a parallel sequence (multi-thread). In example embodiments, the application instance 252a, b running as a service is multithreaded. In example embodiments, the infrastructure of the Service Platform and architectural implementation of one or more components are multithreaded to increase and to maximize flexibility and performance. For example, the Web Application 221 may be multithreaded.

The present invention includes a computer-implemented method of managing services for at least one user integrated into a web system or a web application 221. For example, a service may involve live plant data including sensing actual real-time processing plant operation status data for at least one asset from a set of assets of a processing plant through at least one sensor; recording, to a computer server, the actual real-time processing plant operation status data sensed from the at least one sensor; performing a simulation, through at least one simulation model from a set of simulation models of a planned process design specification, through a computer-implemented simulation engine; recording process design specification data from the simulation, through the computer-implemented simulation engine; correlating the actual real-time processing plant operation status data and the process design specification data through a computer-implemented correlation engine, into a set of correlated data; displaying the set of correlated data, to the at least one user through a computer display, such that the actual real-time processing plant operation status data and the process design specification data are streaming, and visually presented, concurrently, to the at least one user at the same time. In other embodiments, a user may search simulation models, select a model from a listing, for example, by clicking on a specific model to modify simulation design parameters.

An example implementation of the Compatibility/Availability paradigm consists of a simple bar which contains respective icons that represent services and application instances, which is sometimes referred to as a Service Bar 21 or an activation bar. The Service Bar 21 depicted in FIG. 4A may be displayed in the web system or a web application workspace 221a, for example, in the title bar or in the menu bar of a graphical user interface as shown in FIGS. 5 and 6. Only services or application instances 252 running as services that are compatible with the current work are displayed as visual representations of respective icons in the dynamically populated Service Bar 21. For example, the service bar 21 of FIG. 4A shows visual representations of respective icons 37, 35 for Live Plant Data (icon 37 left) and Simulation modeling (icon 35 right) services. In some embodiments, not all of the services or application instances running as services loaded into the whole system 200 appear as visual representations of respective icons; the absence of icons indicates incompatible services or incompatible application instances running as services. The dynamic set of respective icons represents services compatible context-wise with the Web Application 221 or Web Service and currently active work, and the icons (and thus, the icons in the dynamic Service Bar 21) may be context-sensitive. Using this approach for monitoring keeps the icon size, and thus the Service Bar 21, very small in the GUI, too small to use a fine-grained control. The respective icon may be treated as a moderately-sized button. Clicking or tapping the icon may cause the icon to change to something more "finger-friendly." A larger size, magnifying or zooming in on a visual representation of the respective icon (for example, by hovering over, tapping on, or clicking on the icon) may allow a clearer view of the visual representation of the respective icons, and attendant titling of the icon increases the ease of user selection with either finger, track pad or computer mouse.

Figure 7:
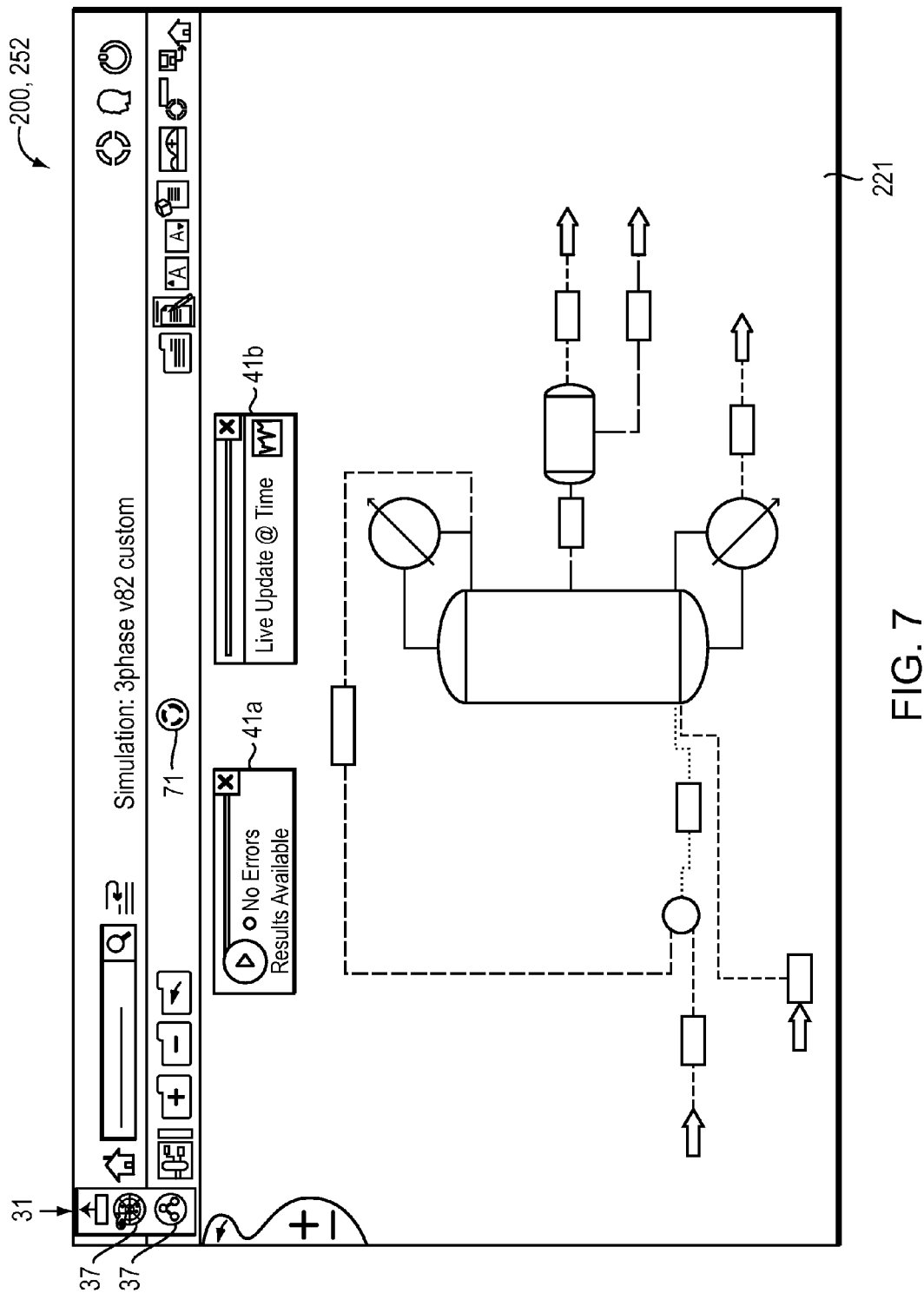
FIG. 7 is a schematic view of a graphical user interface showing a global service bar and service panels while viewing a simulation flow sheet in an embodiment.

Upon selection of the service to be applied by the user selecting the icon corresponding to an available and compatible service, the icon badge or visual representation of the respective icon may leave (or may be removed from) the Service Bar 21 (also referred to as an Activation Bar) of FIGS. 4A, 5 and 6 and may appear in the Global Service Bar 31 in the upper left corner of a working screen view as in FIG. 7. For example, the Global Service Bar 31 shown in detail in FIG. 4B has a permanent part 33 which may hide a uBar that is typically visible in one of Assignees software programs. The Global Service Bar 31 of FIG. 4B also displays a respective icon 35 or service badge for a corresponding Service, which shows the user that he is consuming an Application Instance 252 running as a service. Here, the icon 35 in the Global Service Bar 31 informs the user that the user is consuming a Simulator Application Instance, and the user is consuming or using tokens, part of the licensing mechanism in some embodiments.

In some embodiments, an icon or service badge may appear as a Service Panel. In some embodiments, the respective icon or service badge may appear in the Service Panel to help identify the service associated with and controlled by the Service Panel. In some embodiments, the respective icon may be suppressed from the Service Panel display. For example, in the Simulation modeling Service Panel 41 of FIG. 4C, there is a control button 43 (for example, a play button) to trigger a run of the corresponding service, and a text display field 49 showing the status message from the Service (or Application Instance running as a service), for example, of "Finished running the model." In embodiments, the control button may take other forms or visual representations depending on the Service (or Application Instance running as a service). The Service Panel 41 achieves a couple of objectives. First, the icon badge or visual representation of a respective icon in the original Service Bar 21 or Activation Bar disappears from the Service Bar 21 location of FIGS. 5 and 6 since that service is being consumed (as selected by the user) and is no longer available to apply a second time by the same user in embodiments of the invention. For example, the Service Bar 21 changes from the configuration of FIG. 4A showing icons 35, 37 to the configuration of FIG. 4C, showing only the Live Plant Data Service icon 37 in the Service Bar 21. In other embodiments, a user may be able to apply the same service to multiple tasks. However, consumption of a service may use up finite resources such as license tokens. In some embodiments, the Service Panel may correspond to other visual representations that serve the same functions.

Figure 4B:
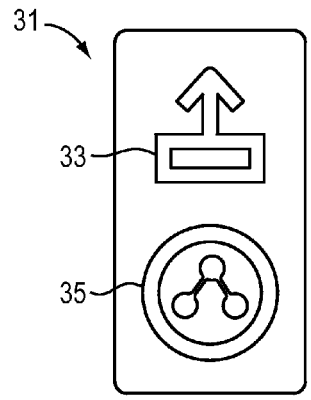
FIG. 4B is an example view of a global service bar in embodiments.
Figure 4C:
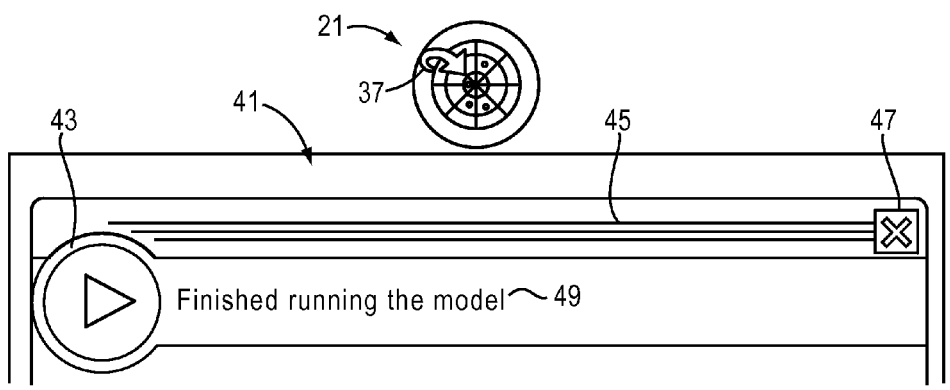
FIG. 4C is an example view of a service panel for a simulation service in embodiments.

Also, since the corresponding icon(s) 35, 37 of FIGS. 4a, 5, 6 are now in the Global Service Bar 31 of FIGS. 4B and 7, the user knows that a service has been applied even if the original page is no longer visible. For example, the user may navigate to a different application instance running as a service such as switching from the simulation modeling application instance to a different screen view of the system 200. The applied service may continue to run in the background and consume services or resources as the user performs other tasks on active work.

Finally, the application of any service causes a Service Panel 41 (FIG. 4C), 41a, b (FIG. 7) to appear in the web application 221 space. This paradigm scales well since it effectively decouples the GUI for any given service 252 from the web application 221 instance that consumes it. This level of decoupling allows a service to create service-centric panels 41 that have built-in service-centric configuration via a slide-out configuration drawer as well as a bevy of unfolding and/or sliding panels that contain any combination of displays and controls. The Service Panel 41 (including 41a, 41b) may become an independent piece of a UI (user interface) or GUI of the Web Application 221. The Service Panel 41 does not require writing or modifying code in each application instance because the Service Panel 41 may be moved around the GUI screen (such as in 221 of FIGS. 5, 6 and 7) without ending the service 252. The decoupling of the GUI from the application instance where the service was applied allows the user to switch tasks and move between application instances to perform various functions in the Web Application 221 or Web Service. The Simulation Service Panel 41 of FIG. 4C, as an example, epitomizes the economy of design esthetic with a drag bar 45 along the top for repositioning the panel with a close button 47 shortcut that releases the service. The drag bar 45 allows the user to grab or drag the Service Panel 41 around the screen. The Service Panels can thus be positioned where the Service Panels do not cover up or obscure areas of the graphical user interface of interest to the user. Additionally, as shown in FIG. 4C, the Service Panel 41 may have one control button 43 to cause the simulation to run (for example, the play button) and one text display field 49 for status messages. One of skill in the art may implement other embodiments of the Service Panel 41 with user controls and providing messages and information from the Application Instance 252 running as a service.

One final point is the release of a Service 252. This happens by way of a single user gesture in the GUI of web application 221. In an example aspenONE implementation (Trademark of Assignee), there are two single user gestures from which to choose. For users that are comfortable with desktop software with windowed environments, there is a close box 47 in the upper right corner of the Service Panel 41, 41a, 41b of FIGS. 4C and 7, which closes the service panel and releases the corresponding service 252. Another option that might be preferred for touch-enabled devices is to simply drag the service panel 41, 41a, 41b (collectively 41) back where it came from, the Service Bar or Activation Bar 21. Illustrative is FIG. 7 and the recycle icon 71 of FIG. 7. This action gives the user visual cues that he is properly navigating and interacting. For example, when the whole service panel 41 or service palette is over the top bar (Service Bar or Activation Bar) 21, the Service Bar or Activation Bar expands and displays a recycle icon 71, giving the user a large target, upon which, to drop the panel, thus releasing (ending use session of) the corresponding service 252. Either of these gestures will release (end a session of) the service.

EXAMPLES

Scenario 1

Service Bar or Activation Bar in a Simulation Flow Sheet

FIG. 5 presents the user interface screen of context compatible and available services while viewing a simulation flow sheet. Here applied to the Web Application 221 is a simulation modeling application instance 252. The Service Bar 21 or Activation Bar shows a Live Plant Data icon 37 and a Simulation icon 35 as compatible and available application instances 252 running as services. In this example, the Simulation service 252 could be run (could be applied to web application 221).

Scenario 2

Service Bar in a Different Simulation Flow Sheet

As shown in FIG. 6, the user interface screen shows context compatible and available services while viewing a different simulation flow sheet than FIG. 5. Here the Web Application 221 is another simulation modeling application instance 252. The Service Activation Bar 21 shows a Live Plant Data icon 37, a Simulation icon 35, and an icon 61 indicating that other services are available as compatible and available application instances 252. In this example, any of these services could be applied to the Web Application 221.

Scenario 3

Simulator Service Icon

A "simulator" is an infrastructure resource with a limited number of simulators available to users, which can be represented as a simulator icon 35 (FIGS. 5 and 6). If a user selects or clicks the simulator icon 35, then the Service Bar 21 responds by showing a decrease of one icon, the simulator icon, because the user selected the simulator service 252 represented by simulator icon 35 and consumed the simulator service 252 represented by simulator icon 35. The system 200 may gray out simulator icon 35 when no simulator instance is available or when all simulators are in use. The system 200 may suppress display of the simulator icon 35 when the user consumes the simulator service 252 (represented by simulator icon 35) or when all simulators are in use. Also in response to user selection of the simulator icon 35, system 200 displays a corresponding service panel 41 or a service palette representing the user selected simulator service. The service panel 41a of FIG. 7 shows the running simulator. A user may consume up to one simulator, thus system 200 removes display of the simulator icon 35 from the home screen.

In the modeling application instance, the user saw collaborative front end engineering design (FEED) with detailed information because the simulator ran in the text display field. The use can change the model field or parameter data and run the model again with a click of a button 43 on the service panel 41 or service palette. The text message 49 appears in the service panel or palette regarding the status of the application instance running as a service (see, for example, FIG. 4C).

Scenario 4

Global Service Bar and Service Panels in a Different Simulation Flow Sheet

As shown in FIG. 7, the user interface screen shows services being consumed or applied to the current work while viewing a different simulation flow sheet. Here the Web Application 221 is another simulation modeling application instance 252. The Global Service Bar 31 in the upper left corner of the GUI is showing (or otherwise serving as a visual cue) that the user is consuming services by the Global Service bar 31 displaying respective icons or icon badges for a Live Plant Data Service 37 and a Simulation modeling Service 35. Both of the compatible services (Live Plant Data and Simulation modeling) with the Web Application 221 were available, made user selectable and applied leaving no services in the Service Bar. The Recycling icon 71 is in the screen view location where the Service Bar is displayed in other example embodiments of the GUI. The user also knows which services are being consumed based on the Service Panels 41a, 41b appearing in the GUI. For example, in FIG. 7, a Simulation modeling Service Panel 41a and a Live Plant Data Service Panel 41b are displayed in the GUI. Both of the service panels are displaying respective status messages from the corresponding services 252, e.g., "No Errors" from the Simulation modeling Service in Service Panel 41a. The drag bars enable the user to move the Service Panels 41a, b within the GUI if, for example, the Live Plant Data Service Panel 41b was blocking part of the simulation flow sheet.

Developing the GUI paradigms for the aspenONE product (Trademark of Assignee) presented challenges due to some many competing objectives, including mobile form factors and touch-enabled devices. For example, managing services can be accomplished using methods and apparatuses of the invention including various desktop, laptop, tablet, mobile devices, and web applications. The use of the Compatibility/Availability paradigm gives the user a maximum amount of choices while avoiding the confusion that comes from showing choices that lead to functional dead ends, failures or illegal states.

By using the Service Palette or Service Panel 41 paradigm, the GUI elements decouple from the application design while making it easier to introduce new services, which may have very different requirements for display and control. A Global Service Bar 31 showing services being consumed provides service context indicators to encourage awareness as users move around the system 200.

Computer Support

Figure 8:
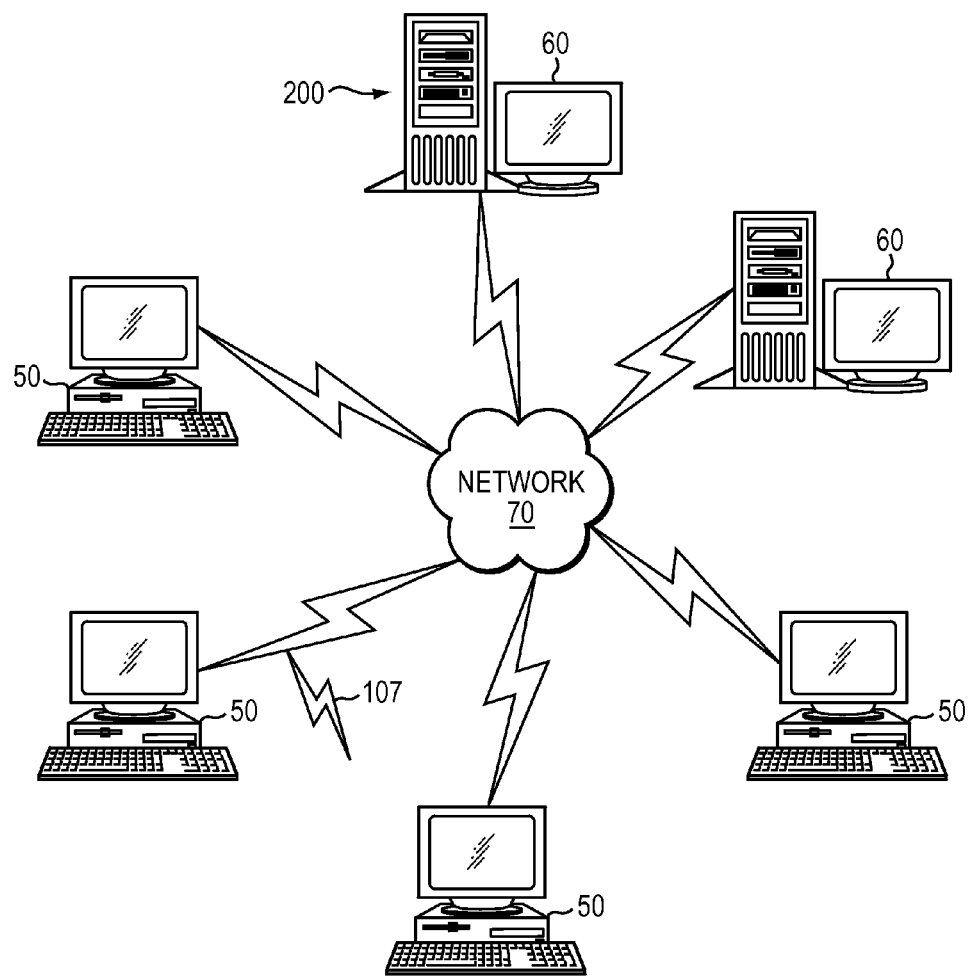
FIG. 8 is a computer network in which embodiments of the present invention are deployed.

FIG. 8 illustrates a computer network or similar digital processing environment in which embodiments of the present invention (method of managing services and apparatus) may be implemented.

Client computer(s)/devices 50 and server computer(s) 60 provide processing, storage, and input/output devices executing application programs and the like. Client computers/devices 50 may be for example desktops, laptops, mobile devices and so forth. The service assembly is formed of a resource adapter, a service platform and a resource agent service. The digital resource manager is operatively coupled to the service assembly in a manner that aptly provides in a web application, user selectability of a contextually compatible (i.e., pertinent) service as the service becomes available. A single client computer/device 50 or server computer 60 may host one or more services.

Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 9:
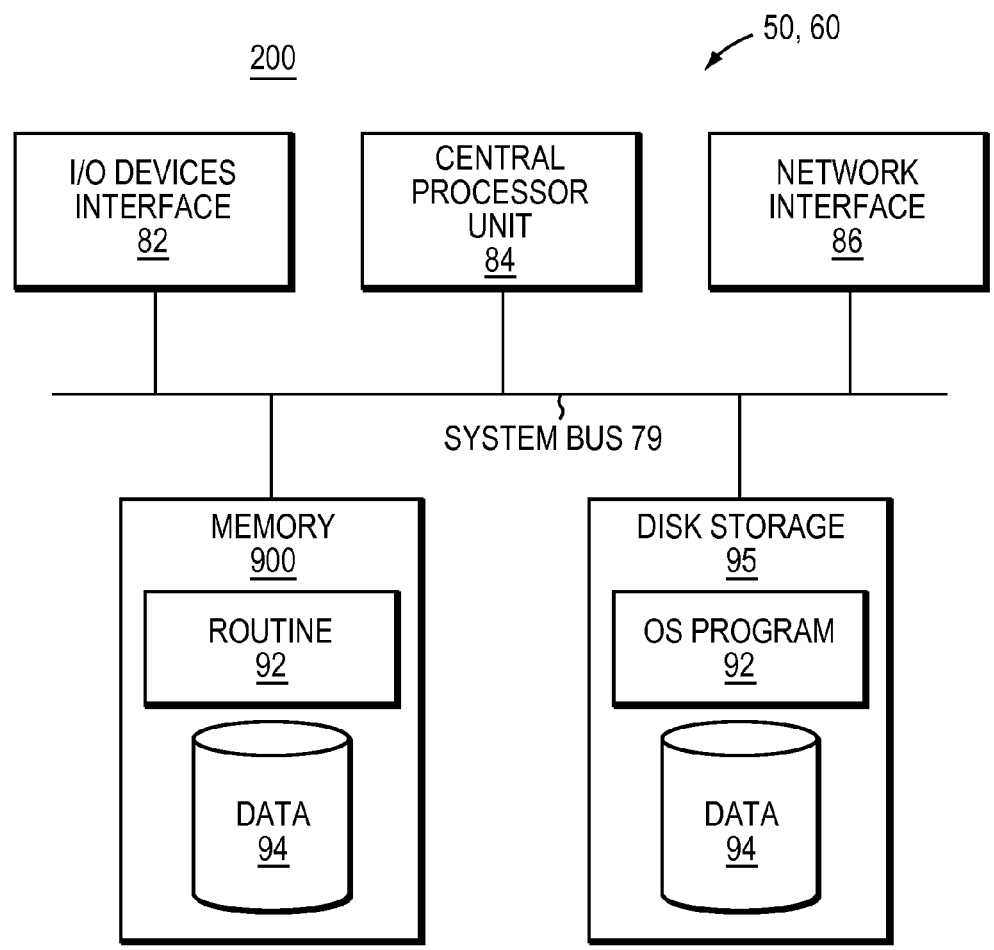
FIG. 9 is a computer node, such as a mobile device, portable processor, client or server, in the computer network of FIG. 8.

FIG. 9 is a diagram of the internal structure of a computer (e.g., client processor/device 50 or server computers 60) in the computer system of FIG. 8. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 8). Memory 900 provides volatile storage for computer software instructions 92 and data 94 used to implement an embodiment of the present invention (e.g., Enterprise Service System 200 and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/ program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of managing services comprising:
providing an enterprise web application executable on a processor;
monitoring, by a computer, context of currently active work in the enterprise web application, said monitoring producing, based on context, a visual representation of respective icons of contextually compatible services in a graphical user interface displayed in the enterprise web application;
for each displayed icon, indicating in the graphical user interface an availability of the corresponding service using different states of the icon;
a first state of the icon indicating an availability and a second state of the icon indicating an unavailability;
receiving a user selection of one of the displayed icons corresponding to an available and contextually compatible service to be applied to the currently active work in the enterprise web application, the selected one icon being in the first state before user selection;
upon application of the corresponding service to the currently active work, changing indication of availability of the service by changing the state of the selected one icon to the second state, wherein (i) the corresponding service includes a live plant data service and a simulation modeling service, and (ii) the computer responsively displays to the user simulation data of the simulation modeling service, and plant data of the live plant data service, the simulation data and plant data being displayed in a side-by-side manner; and
releasing the corresponding service in response to a single user gesture in the graphical user interface.

2. A method as claimed in claim 1 wherein each icon is context-sensitive.

3. A method as claimed in claim 1 wherein, in the first state, the icon is displayed illuminated in color.

4. A method as claimed in claim 1 wherein, in the second state, the icon is displayed dimmed or grayed out.

5. A method as claimed in claim 1 further comprising changing the icon to a third state during consumption of the corresponding service, and in the third state suppressing display of the icon.

6. A method as claimed in claim 1 wherein the user is an enterprise system user.

7. A method as claimed in claim 1 wherein the enterprise web application is a process engineering application.

8. A method as claimed in claim 1 wherein the respective icons of the one or more contextually compatible services are displayed in a service activation bar area of the graphical user interface.

9. A method as claimed in claim 1 wherein an indication of the user-selected icon is displayed in a service panel area.

10. A method as claimed in claim 1 wherein the single user gesture is any of: a user operating a close box or the user dragging and dropping an indication of the corresponding service to a certain area in the graphical user interface.

11. A computer system for managing services comprising:
a service assembly supplying one or more services to an enterprise web application that is executing on a processor; and
a digital resource manager operatively coupled to the service assembly;

the digital resource manager monitoring in-context compatibility of one or more of the services with currently active work in the enterprise web application, said monitoring producing, based on context, a visual representation of a respective icons of contextually compatible services in a graphical user interface displayed in the enterprise web application;

for each displayed icon, the digital resource manager indicating in the graphical user interface an availability of the corresponding service using different states of the icon;
   a first state of the icon indicating an availability, a second state of the icon indicating an unavailability, and a third state of the icon indicating service consumption;

the digital resource manager receiving a user selection of the icon corresponding to an available and contextually compatible service to be applied to the currently active work in the enterprise web application, the icon being in the first state before user selection;

upon application of the corresponding service to the currently active work, the digital resource manager changing indication of availability of the service by changing state of the corresponding icon to at least one of the second and the third state, the corresponding service including a live plant data service and a simulation modeling service, and in response to application of the corresponding service, the digital resource manager outputting display of simulation data of the simulation modeling service and plant data of the live plant data service, the digital resource manager displaying the simulation data and the plant data in a side-by-side manner; and the digital resource manager releasing the corresponding service in response to a single user gesture in the graphical user interface.

12. A system as claimed in claim 11 wherein each icon is context-sensitive.

13. A system as claimed in claim 11 wherein, in the third state during consumption of the corresponding service, the icon display is suppressed.

14. A system as claimed in claim 11 wherein the user is an enterprise system user.

15. A system as claimed in claim 11 wherein the single user gesture is any of: a user operating a close box or the user dragging and dropping an indication of the corresponding service to a certain area in the graphical user interface.

16. A computer program product providing method of managing services comprising:
   a non-transitory computer useable medium having a computer readable program;
   wherein the computer readable program when executed on a computer causes one or more computers to:
      allow an enterprise web application to execute on a processor;
      monitor in-context compatibility of one or more services with currently active work in the enterprise web application, said monitoring producing, based on context, a visual representation of a respective icon for each contextually compatible service in a graphical user interface displayed in the enterprise web application;
      for each displayed icon, indicate in the graphical user interface an availability of the corresponding service using different states of the icon;
         a first state of the icon indicating an availability, a second state of the icon indicating an unavailability, and a third state of the icon indicating service consumption;
      receive a user selection of the icon corresponding to an available and contextually compatible service to be applied to the currently active work in the enterprise web application, the icon being in the first state before user selection;
   upon application of the corresponding service to the currently active work, change indication of the availability of the service by changing the state of the corresponding icon to the icon to at least one of the second and third state, wherein the corresponding service includes a live plant data service and a simulation modeling service, and in response to application of the corresponding service display simulation data of the simulation modeling service and plant data of the live plant data service, the simulation data and the plant data being displayed in a side-by-side manner; and
   release the corresponding service in response to a single user gesture in the graphical user interface.

17. A product as claimed in claim 16 wherein each icon is context-sensitive.

18. A product as claimed in claim 16 wherein, in the third state, the icon is not displayed in one screen view of the graphical user interface.

19. A product as claimed in claim 16 wherein the single user gesture is any of: a user operating a close box or the user dragging and dropping an indication of the corresponding service to a certain area in the graphical user interface.

20. A method as claimed in claim 1, wherein the corresponding service comprises a service assembly, the service assembly including a resource adapter, a service platform, and a resource agent service.

21. A method as claimed in claim 1, wherein the corresponding service is decoupled from the enterprise web application.

* * * * *